United States Patent [19]

Logunov et al.

[11] Patent Number: 5,733,508
[45] Date of Patent: Mar. 31, 1998

[54] OXYGEN GENERATOR

[75] Inventors: Aleksei T. Logunov, Dolgoprudny; Igor A. Smirnov; Petr P. Martyntsev, both of Moscow, all of Russian Federation; Valery V. Shapovalov, Donetsk, Ukraine; Vladimir I. Vanin, Donetsk, Ukraine; Viktor S. Maslyaev, Donetsk, Ukraine

[73] Assignee: Alexandr Grigorievich Vorobei, Ramenskoe, Russian Federation

[21] Appl. No.: 716,242

[22] PCT Filed: Feb. 17, 1995

[86] PCT No.: PCT/RU95/00027

§ 371 Date: Sep. 20, 1996

§ 102(e) Date: Sep. 20, 1996

[87] PCT Pub. No.: WO96/25226

PCT Pub. Date: Aug. 22, 1996

[51] Int. Cl.$^6$ ..................................... A62B 7/08
[52] U.S. Cl. ............... 422/125; 252/186.1; 252/186.21; 252/186.38; 252/186.43; 252/187.31; 422/120
[58] Field of Search ..................... 422/120, 125; 252/186.1, 186.21, 186.38, 186.43, 187.31

[56] References Cited

U.S. PATENT DOCUMENTS

| | | | |
|---|---|---|---|
| 3,573,001 | 3/1971 | Bovard | 23/281 |
| 3,736,104 | 5/1973 | Churchill et al. | 422/120 |
| 3,806,323 | 4/1974 | Thompson | 23/281 |
| 4,073,741 | 2/1978 | Heintz | 252/187 |
| 4,115,069 | 9/1978 | Martin et al. | 422/112 |
| 4,209,491 | 6/1980 | Ricn, III | 422/110 |
| 4,230,667 | 10/1980 | Williams | 422/113 |

FOREIGN PATENT DOCUMENTS

| | | | |
|---|---|---|---|
| 1 283 819 | 6/1972 | United Kingdom | C01B 13/02 |
| 1288459 | 9/1972 | United Kingdom | |
| 1401902 | 8/1975 | United Kingdom | |

Primary Examiner—Edward J. Cain
Attorney, Agent, or Firm—Lowe, Price, LeBlanc & Becker

[57] ABSTRACT

Described herein is an oxygen generator, comprising shell-enclosed one or more briquettes located on respective heaters and made of a substance that releases oxygen when exposed to heat.

The subject matter of the invention also an oxygen-containing composition.

11 Claims, 4 Drawing Sheets

5,733,508

OXYGEN GENERATOR

TECHNICAL FIELD

The present invention relates in general to oxygen producing devices, more specifically to devices for oxygen production by thermal decomposition of a solid oxygen-containing substance.

BACKGROUND ART

Known in the art are oxygen generation by thermal decomposition of a solid oxygen-containing substance. British Patent 1,283,819 (Int. Cl. G01B 13/02, published 1972) can be adduced as an example which recites an oxygen generator, comprising a shell accommodating a solid oxygen-containing substance. The substance appears as a briquette (called "the candle" in the patent under discussion) having an axial passage filled with a filtering medium, while located in the upper portion of said passage is a resistive heater connected to a source of electric power. Once the heater has been energized, the candle of the oxygen-containing substance is ignited, and the resultant oxygen is passed through the filter in the candle passage and is discharged through an outlet union in the generator shell.

The aforediscussed generator is a disposable source of oxygen and is subject to replacement after the candle of the oxygen-containing substance has burnt up.

Among the hitherto-known oxygen-containing substances; capable of releasing oxygen upon being heated, a composition is noticeable according to U.S. Pat. No. 4,073,741 (NPC 252-187 published 1978). The composition comprises sodium perchlorate, silicon dioxide, and a cobalt-containing catalyst, and is featured by too a low decomposition rate upon being heated.

DISCLOSURE OF THE INVENTION

It is a principal object of the present invention to provide a repeated-use oxygen generator operating on solid oxygen-containing elements.

It is another object of the present invention to provide an oxygen generator featuring a controlled oxygen generating process.

It is one more object of the present invention to provide such an oxygen-containing composition that features a higher decomposition rate.

The principal object of the invention is accomplished due to the fact that in an oxygen generator having a shell provided with an outlet union and accommodating a briquette of an oxygen-containing composition having a recess or a through opening for a heater, said briquette is a replaceable one for which purpose it is enclosed in a protective sheathing. The heater is also enclosed in a casing which isolates it hermetically from both the briquette and the shell interior. It is due to the aforesaid construction arrangement that firstly the heater acquires the function of a carrier component on which the briquette is located ("put over"), and secondly, the products released by the heater itself are prevented from getting to the oxygen being generated.

The heater may be of diverse types. When an electric heater is used, its casing may be filled (fully or partly) with a heat-conducting material. A chemical heater can be made use of, wherein its casing is filled with chemical substances that interreact to release heat. To initiate such a heater at least one of the heat-releasing reagents is enclosed in a destructible container. In this case, inasmuch as the heater becomes consumable, it should be replaceable. To enhance heat transfer from the heater to the oxygen-containing briquette, the heater casing may be provided with a radiator and a metal sleeve may be fitted in the recess or through opening of the briquette.

The second of the foregoing objects of the invention, that is, control of the oxygen generating process, is accomplished due to the provision of an oxygen generator having a number of the oxygen-containing briquettes enclosed in the same shell. In this case the generator shell is provided with heat-insulating partitions interposed between the individual briquettes, each of them has its own heater. Such a construction arrangement of the oxygen generator makes it possible to provide for a successive, parallel, or combined operation of the individual briquettes, thereby effecting control of the oxygen-generating process. The aforedescribed generator can be built into an oxygen supply system which may incorporate, apart from said generator, also an oxygen accumulator and pipings provided with the oxygen pressure and flow-rate control and monitoring means and those for consumers' connection.

And the third object of the invention, viz., an increased rate of decomposition of the oxygen-containing element is accomplished due to adding magnesium perchlorate and sodium superoxide and/or sodium peroxide thereto.

BRIEF DESCRIPTION OF THE DRAWINGS

In what follows the essence of the present invention and some specific exemplary embodiments thereof are illustrated in the accompanying drawings, wherein.

BEST MODE FOR CARRYING OUT THE INVENTION

Figure 1:
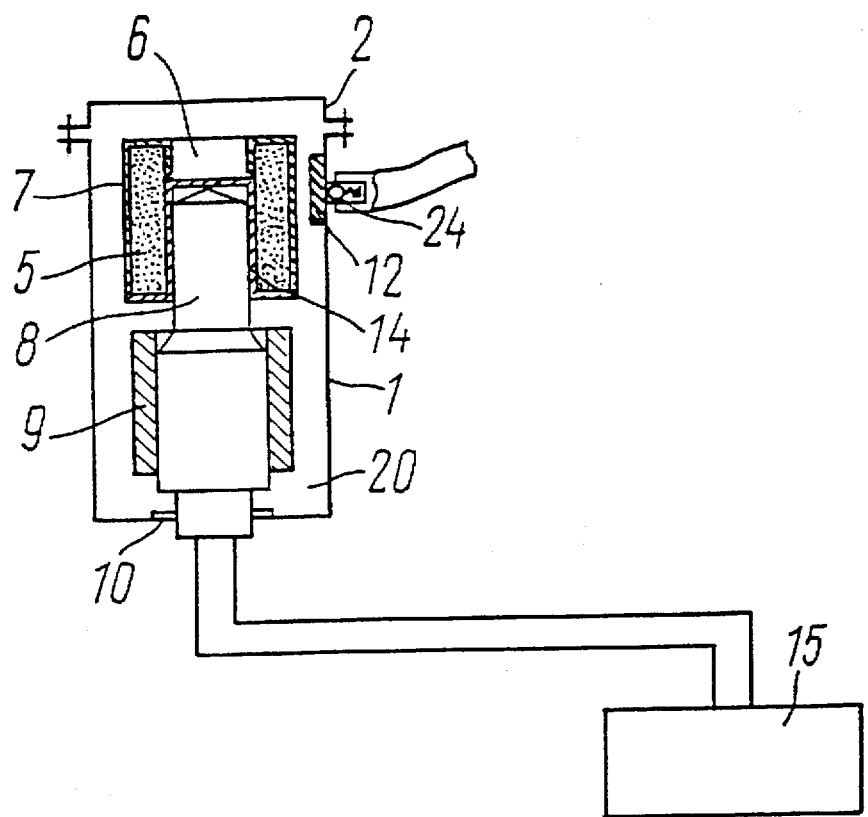
FIG. 1 is a general schematic view of an oxygen generator with a single element (briquette)

The oxygen generator (FIG. 1) comprises a shell 1 with a cover 2, a heater 8 fitted in a recess or through opening 6, and a replaceable oxygen-containing briquette 5 enclosed in a protective sheathing 7. The generator can also be provided with a filter 12 and a check valve 24. The heater 8 may have a radiator 9 and a sealing means 10. A sleeve 14 encompassing the heater 8 may be fitted in the recess or through opening 6 of the briquette.

Figure 2:
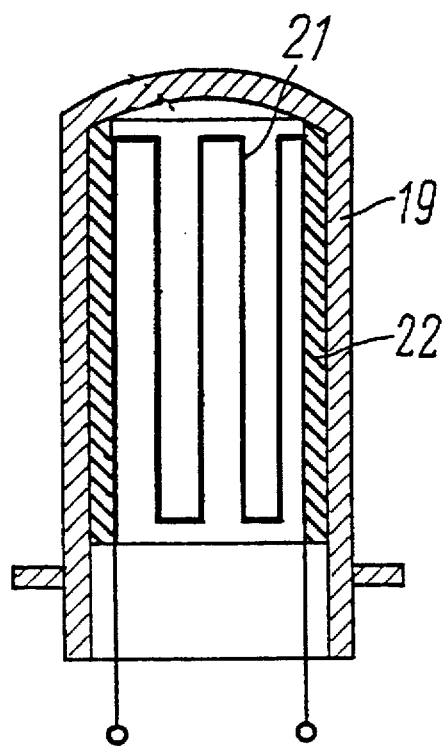
FIG. 2 is a side sectional view of an electric heater.

The heater (FIG. 2) appears as a hollow casing 19 accommodating a source of heat and hermetically isolating said source from an interior 20 of the generator shell. Used as the source of heat may be a thermoelectric element 21. A heat-conducting material 22 may be interposed between the thermoelectric element 21 and the casing 19.

The oxygen generator, according to the abovedescribed embodiment, operates as follows.

The generator operation begins with turning on the heater 8 by energizing the thermoelectric element 21 to a power source. Once a definite temperature has been attained in the recess or through opening 6 of the briquette 5, decomposition of the oxygen-containing substance occurs, accompanied by oxygen release.

Then two variants are possible:

1. The process proceeds further spontaneously, and the heater can be turned out.
2. The process continues only when a heat energy is supplied from the heater; thus, the heater should be turned on permanently.

The oxygen released fills the shell interior, and is then delivered, having passed through the filter 12 and the check valve 24, to consumers.

Figure 3:
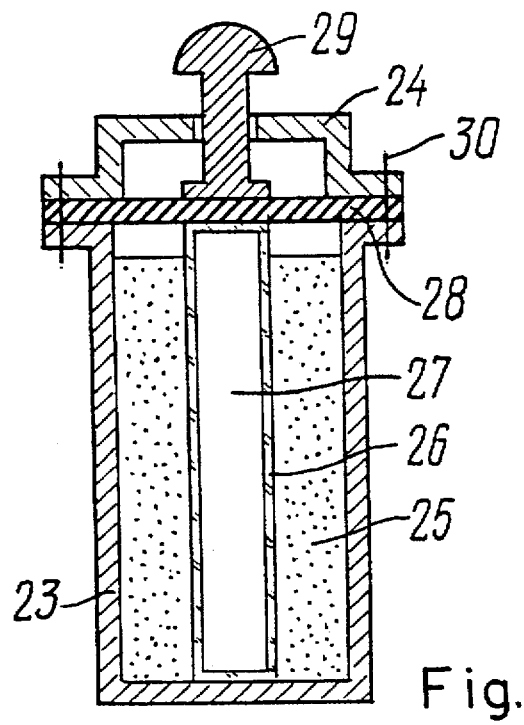
FIG. 3 is a side view of a chemical heater.

In an embodiment of the oxygen generator with a chemical heater (FIG. 3), a chemical source of heat is accommodated in the interior of the casing 19, said source comprising a housing 23 with a cover 24, which is charged with, e.g., an aluminium hydroxide powder 25, and a destructible container, i.e., a glass ampoule 26 with sulfuric acid 27. The interior of the housing 23 is closed with an elastic membrane 28 against which a button 29 is pressed which is mounted in the cover 24 with a possibility of axial motion. The cover 24 is held to the housing 23 with the aid of fastening elements 30. The aforementioned chemical source of heat may be replaceable.

The operating principle of the chemical heater is based on the use of heat of an exothermic reaction (in particular, that of sulfuric acid with aluminium hydroxide) which runs inside the heater housing. The heat energy thus released is transferred, via the walls of the heater housing and the protective sheathing of the oxygen-containing element, to the oxygen-containing composition, thus raising its temperature, whereby an oxygen releasing reaction starts therein.

The heater is put in operation by pressing, either manually or automatically, the button 29. As a result, the elastic membrane forces against the glass ampoule 26 containing sulfuric acid to destruct it and to let said acid react with the aluminium hydroxide powder enclosed in the housing of the heater 23.

A cardinal disadvantage inherent in the process of oxygen release from a solid oxygen-containing element resides in its being uncontrollable, that is, once the reaction has commenced, oxygen is released until the reactants are used up completely and at an approximately constant rate which depends on a given specific composition and overall dimensions of the oxygen-containing element. This, however, does not suit consumer's requirements in quite a number of instances.

Figure 4:
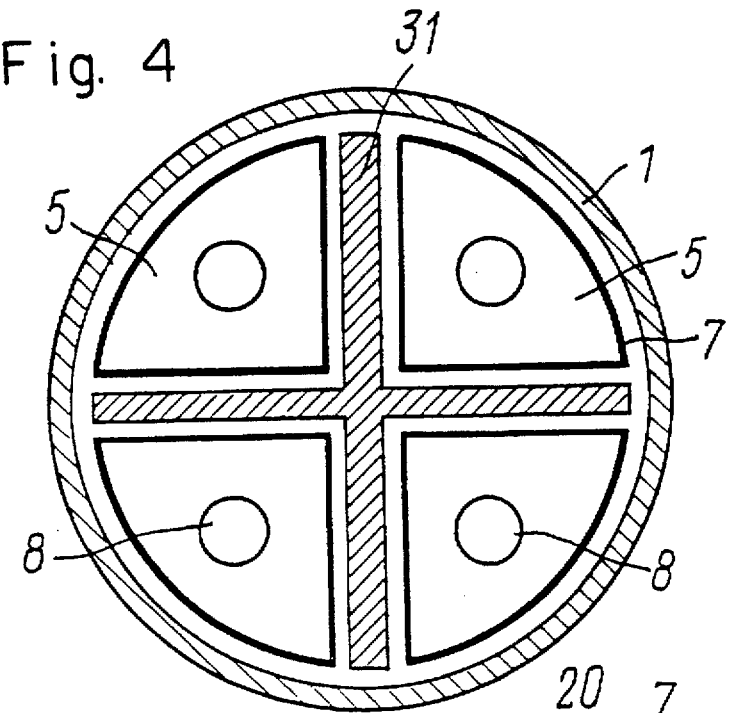
FIG. 4 is a plan view of an oxygen generator with a number of the elements (briquettes) and the cover out of position.
Figure 5:
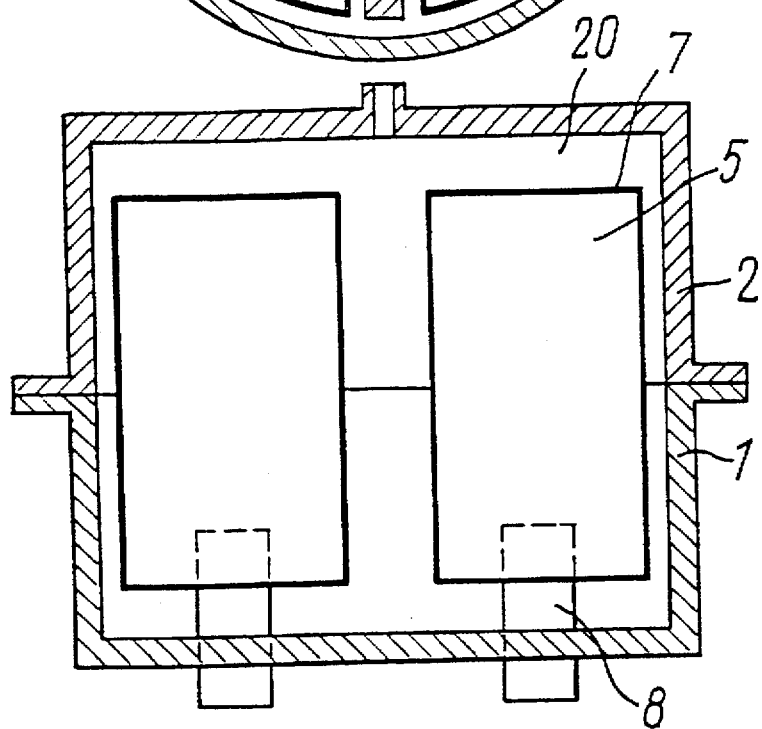
FIG. 5 is a side sectional view of a multielement oxygen generator with the heat-insulating partitions removed.

To provide a possibility of a stepwise control of the oxygen generation rate, improved weight-and-size characteristics, and better operational convenience, use is made of an embodiment of the oxygen generator, whereby a number of the oxygen-containing briquettes are accommodated in the same casing (1), each of them having its own heater (FIG. 4). To ensure against a spontaneous decomposition of the briquettes under the effect of a flow of heat passing from the adjacent "operative" briquette, a heat-insulating partition 31 can be provided.

Oxygen-containing elements can be put in operation, either manually or automatically, in the real-time mode, or one after another, or in parallel, or else in a successive-parallel mode in diverse combinations, thus ensuring a stepwise control of the oxygen releasing rate.

Figure 6:
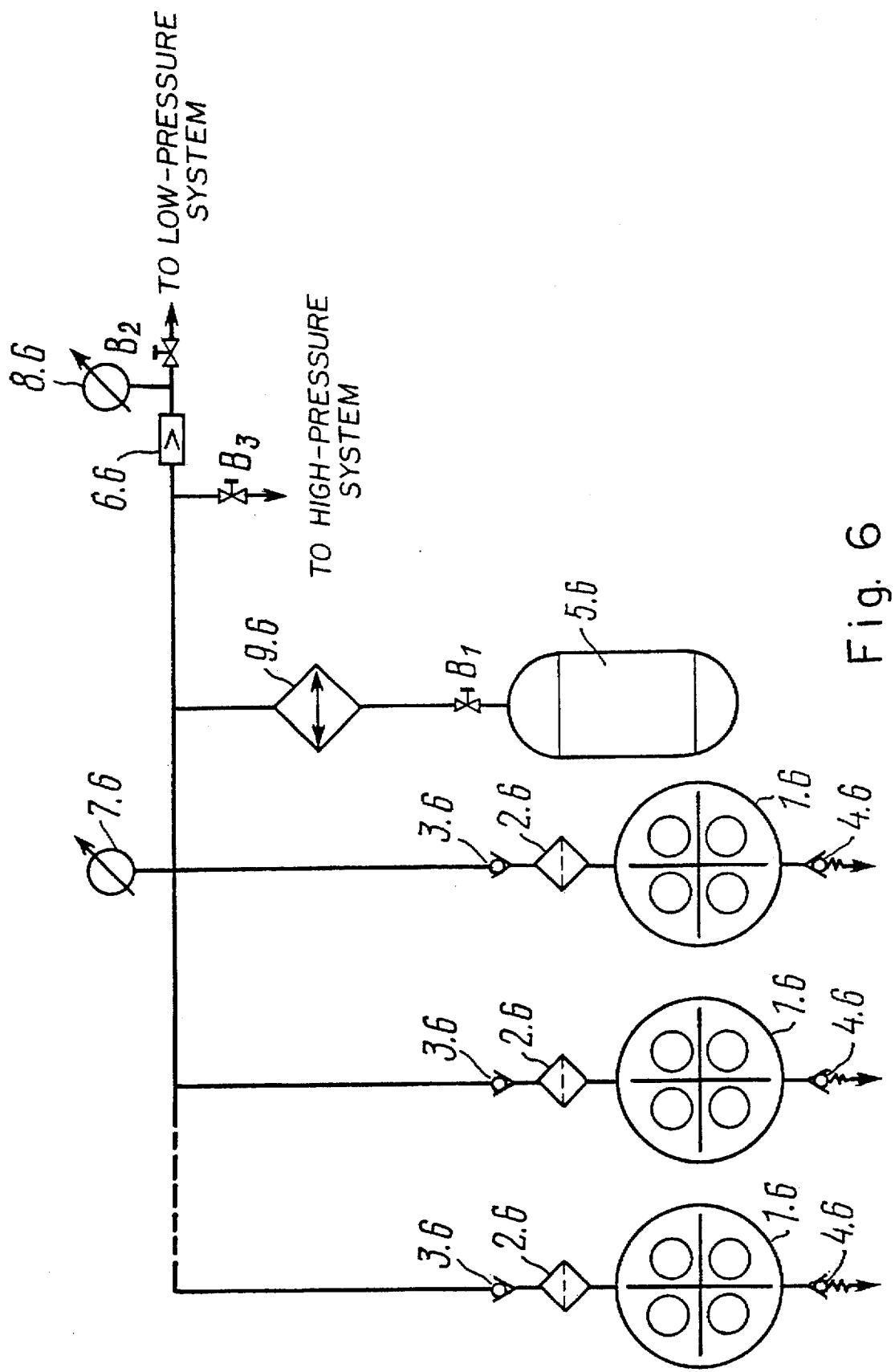
FIG. 6 illustrates an oxygen supply system.

An oxygen supply system (FIG. 6) may be established on the basis of the aforedisclosed oxygen generator, comprising one or more oxygen generators 1.6 having filters 2.6, check valves 3.6, emergency gas discharge valves 4.6, an oxygen accumulator 5.6, stop valves B1, B2, B3, an oxygen pressure reducer 6.6 and/or flow-rate governor, and pressure gauges 7.6 and 8.6. The system can also incorporate a cooler 9.6. It is due to such a combination of the functional elements that the present oxygen supply system is capable, with an appropriately selected oxygen-containing composition, of supplying consumers with oxygen in a very wide range of pressures, including filling oxygen cylinders up to a pressure of 200–250 atm and over without the use of compressors. All the components of the system van be enclosed in a common housing.

An oxygen accumulator may be made by any of the heretofore-known ways. The presence of said accumulator in the oxygen supply system provides for a stepless control of oxygen supply, as well as makes possible to cut off the flow oxygen before the termination of the oxygen-containing element decomposition, without losing oxygen in this case.

The aforedescribed oxygen generators can operate on the most diverse oxygen-containing compositions capable of oxygen releasing under thermal decomposition; however, the herein-proposed composition is substantially advantageous over all other ones.

According to the invention, the proposed composition incorporates (on the weight percent basis):

| | |
|---|---|
| magnesium perchlorate | 9.6–50 |
| sodium perchlorate | 1–40 |
| silicon dioxide | 3–18 |
| sodium superoxide and/or sodium peroxide | to make up 100%. |

The composition may also contain a cobalt-containing catalyst taken in an amount of up to 5%.

The variants of the composition were tested on dia. 40 mm tablets having an internal passage 18 mm diameter. The tablets were manufactured pressing 100 g of the oxygen-containing composition under a load of 15 tons. The oxygen-releasing process was initiated by a dia. 17.5 mm tubular electric heater having a power of 100 W. The heater was placed in the internal passage of the tablet and turned on for 2 min, within which the temperature of the heater surface changed from room to 700° C. The amount of the oxygen released was determined against a difference between the initial weight of the tablet and its weight upon termination of the oxygen releasing process. The rate of decomposition of the oxygen-containing element was determined according to the period of time for which the chemical reaction zone migrated from the heater to the outside surface of the tablet.

EXAMPLE

There were weighed on a counter balance 30 g magnesium perchlorate, 45 g sodium superoxide, 10 g silicon dioxide, 14.5 g sodium perchlorate, and 0.5 g cobaltous chloride. The ingredients were placed in a one-liter vessel, and added thereto were 15 steel balls having a diameter of 20 mm. Then the vessel was closed tightly and subjected to shaking for 30 min. The resultant homogeneous composition was placed in a press-mould and subjected to pressing on a hydraulic press under a load of 15 tons. The resultant tablet was put onto the heater, and the latter was turned on for 2 min. A stopwatch was started at the instant when decomposition commenced. Once the decomposition zone had reached the tablet outside surface, the stopwatch was turned out.

Once the reaction had terminated, the tablet was put out of the heater, cooled in an exsiccator, and weighed.

The results found: amount of oxygen released—44.3%, decomposition rate—10.6 mm/min.

The results obtained with other ratios of the ingredients are tabulated in Table below.

| Composition | Content, wt. % | | | | | | Amount of oxygen | Decomposition rate, mm/min |
|---|---|---|---|---|---|---|---|---|
| | 1 | 2 | 3 | 4 | 5 | 6 | | |
| Proposed herein | 40 | 10 | 9.9 | 40 | — | 0.1 | 44.5 | 21 |
| 2 | 50 | 13 | 18 | 18 | — | — | 8 | 3.2 |
| 3 | 10 | 7 | 3 | 80 | — | 0.1 | reaction does not run | — |
| 4 | 30 | 30 | 10 | 30 | — | — | 9.9 | 3.2 |
| 5 | 30 | 25 | 10 | 30 | — | 5 | 40 | 2.2 |
| 6 | 30 | 20 | 10 | — | 40 | — | 21 | 16 |
| 7 | 30 | 15 | 10 | — | 40 | 5 | 34 | 29 |
| 8 | 30 | 20 | 10 | 20 | 20 | — | 11.5 | 9.5 |
| 9 | 30 | 15 | 10 | 20 | 20 | 5 | 39 | 17.4 |
| Known | | | | | | | 38.4 | 25.2 | where:

1—magnesium perchlorate, 2—sodium perchlorate, 3—silicon dioxide, 4—sodium superoxide, 5—sodium peroxide, 6—cobaltous chloride.

As can be seen from the tabulated data, the proposed composition enables a higher decomposition rate to be attained.

INDUSTRIAL APPLICABILITY

The hereinbefore-described oxygen generators, the oxygen supply system, and the oxygen-containing composition can find application in most diverse trades, where oxygen is required, e.g., in power generating units, engines, pressure-sealed objects (underwater and underground apparatus, aviation, ground transport facilities, spacecraft), in oxygen cutting of materials, in medical engineering (for filling oxygen bags, connecting to the distributing mains of medical therapeutic institutions, for filling oxygen bottles, in hyperbaric chambers), etc.

We claim:

1. An oxygen generator, comprising a shell which accommodates a briquette of a solid oxygen-containing composition capable of releasing oxygen when exposed to heating and having a recess or a through opening, wherein a heater is located, CHARACTERIZED in that the briquette is enclosed in a protective sheathing and is positioned on the heater with a possibility of being replaced, while the heater is enclosed in a casing which isolates it hermetically from the briquette and from the interior of the generator shell.

2. A generator as set forth in claim 1, CHARACTERIZED in that the heater is of the electric type, and its casing contains a heat-conducting material.

3. A generator as set forth in claim 1, CHARACTERIZED in that the heater casing accommodates substances that interreact to liberate heat, at least one of said substances being placed in a destructible container.

4. A generator as set forth in claim 1, CHARACTERIZED in that the heater is replaceable.

5. A generator as set forth in claim 1 CHARACTERIZED in that the heater casing is provided with a radiator.

6. A generator as set forth in any of claim 1 CHARACTERIZED in that a metal sleeve is placed in the recess or a through opening of the briquette.

7. An oxygen generator, comprising a shell accommodating an oxygen-containing composition capable of oxygen releasing when exposed to heat, and a heater, CHARACTERIZED in that the oxygen-containing composition is shaped as a number of briquettes, each having a recess or a through opening and being provided with its own heater fitted in the recess or opening of the briquette.

8. A generator as set forth in claim 7, CHARACTERIZED in that heat insulating partitions are interposed between the individual briquettes.

9. An oxygen supply system, comprising at least one oxygen generator, an oxygen accumulator, pipings provided with oxygen pressure and flow-rate control and monitoring means and those for consumers' connection, CHARACTERIZED in that the oxygen generator appears as a shell accommodating at least one replaceable briquette of an oxygen-containing composition capable of oxygen releasing when exposed to heat and having a recess or a through opening for the heater to accept.

10. A composition for oxygen producing, consisting of sodium perchlorate and silicon dioxide, CHARACTERIZED in that it incorporates also magnesium perchlorate and sodium superoxide and/or sodium peroxide with the following content of the components (on a weight percent basis):

| | |
|---|---|
| magnesium perchlorate | 9.6–50 |
| sodium perchlorate | 1–40 |
| silicon dioxide | 3–18 |
| sodium superoxide and/or sodium peroxide | to make up 100%. |

11. A composition as set forth in claim 10, CHARACTERIZED in that it incorporates also a cobalt-containing catalyst in the form of cobaltous chloride taken in an amount of up to 5 wt. %.

* * * * *